United States Patent
Mao et al.

(10) Patent No.: US 11,038,433 B2
(45) Date of Patent: Jun. 15, 2021

(54) PHASE ALIGNMENT CIRCUIT AND METHOD OF RECEIVE END, AND RECEIVE END

(71) Applicant: HUAWEI TECHNOLOGIES CO., LTD., Guangdong (CN)

(72) Inventors: Yunhe Mao, Shenzhen (CN); Zhixian Wu, Dongguan (CN); Xiaosheng Zeng, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/137,786

(22) Filed: Dec. 30, 2020

(65) Prior Publication Data
US 2021/0126544 A1   Apr. 29, 2021

Related U.S. Application Data

(63) Continuation of application No. PCT/CN2019/107419, filed on Sep. 24, 2019.

(30) Foreign Application Priority Data

Dec. 17, 2018 (CN) .......................... 201811543560.6

(51) Int. Cl.
*H02M 3/335* (2006.01)
*H02M 1/08* (2006.01)
(Continued)

(52) U.S. Cl.
CPC ....... *H02M 3/33592* (2013.01); *B60L 53/122* (2019.02); *H02J 50/12* (2016.02); *H02M 1/083* (2013.01)

(58) Field of Classification Search
CPC .......... H02M 1/083; H02J 7/025; H02J 50/10; H02J 50/12; H02J 50/80; H02J 7/045; B60L 53/122
See application file for complete search history.

(56) References Cited

U.S. PATENT DOCUMENTS 4,306,283 A * 12/1981 Kiwaki .................. H02M 7/19
363/68
5,151,638 A *  9/1992 Beckerman .......... H02H 1/0007
318/266
(Continued)

FOREIGN PATENT DOCUMENTS

CN       101557227 A       10/2009
CN       102005924 A        4/2011
(Continued)

OTHER PUBLICATIONS

Ruikun Mai et al, An Active-Rectifier-Based Maximum Efficiency Tracking Method Using an Additional Measurement Coil for Wireless Power Transfer. IEEE Transactions on Power Electronics, vol. 33, No. 1, Jan. 2018, 13 pages.

*Primary Examiner* — Yusef A Ahmed
(74) *Attorney, Agent, or Firm* — Womble Bond Dickinson (US) LLP

(57) ABSTRACT

This application discloses a phase alignment circuit and a method of a receive end, and a receive end. The receive end is located on an electric vehicle. The phase alignment circuit includes a phase measurement circuit and a controller. The controller is configured to: use, as an actual phase shift angle, a result obtained by subtracting a phase difference from a preset phase shift angle, and control a phase of a bridge arm voltage of a rectifier to lag behind the phase of the input current fundamental component by the actual phase shift angle. The controller outputs a drive signal for a controllable switching transistor of the rectifier by using the actual phase shift angle. Because a lagging phase caused due to filtering is compensated for, precision of synchronization between the bridge arm voltage and the input current can be increased.

10 Claims, 9 Drawing Sheets

(51) Int. Cl.
*B60L 53/122* (2019.01)
*H02J 50/12* (2016.01)

(56) References Cited

U.S. PATENT DOCUMENTS

| | | | |
|---|---|---|---|
| 2002/0079974 A1 | 6/2002 | Bergmann et al. | |
| 2006/0097703 A1* | 5/2006 | Suzuki | H02P 9/48 |
| | | | 322/20 |
| 2014/0015328 A1* | 1/2014 | Beaver | H02J 7/34 |
| | | | 307/104 |
| 2014/0334193 A1* | 11/2014 | Meyer | H01L 41/044 |
| | | | 363/21.01 |
| 2015/0298559 A1* | 10/2015 | Keeling | B60L 11/182 |
| | | | 320/108 |
| 2016/0143104 A1* | 5/2016 | Chen | H05B 45/37 |
| | | | 315/200 R |
| 2016/0371572 A1* | 12/2016 | Saiki | G06K 15/406 |
| 2017/0187292 A1* | 6/2017 | Schaemann | H02M 1/44 |
| 2017/0237293 A1* | 8/2017 | Faraone | H02J 50/12 |
| | | | 713/300 |
| 2017/0256958 A1* | 9/2017 | Irish | H02J 5/005 |
| 2018/0175829 A1* | 6/2018 | Hlebowitsh | H02J 7/025 |
| 2018/0205306 A1* | 7/2018 | Huang | H02M 1/083 |
| 2018/0342889 A1 | 11/2018 | Mynar | |
| 2019/0058357 A1* | 2/2019 | Du | H02J 50/80 |
| 2019/0312467 A1* | 10/2019 | Mynar | H02J 50/12 |
| 2020/0381945 A1* | 12/2020 | Wang | H02J 50/90 |

FOREIGN PATENT DOCUMENTS

| | | |
|---|---|---|
| CN | 102185812 A | 9/2011 |
| CN | 102801413 A | 11/2012 |
| CN | 203219200 U | 9/2013 |
| CN | 105391663 A | 3/2016 |
| CN | 106451819 A | 2/2017 |
| CN | 109672343 A | 4/2019 |
| WO | 2017136491 A1 | 8/2017 |

* cited by examiner

PHASE ALIGNMENT CIRCUIT AND METHOD OF RECEIVE END, AND RECEIVE END

CROSS-REFERENCE TO RELATED APPLICATIONS

This application is a continuation of International Patent Application No. PCT/CN2019/107419, filed on Sep. 24, 2019, which claims priority to Chinese Patent Application No. 201811543560.6, filed on Dec. 17, 2018. The disclosures of the aforementioned applications are hereby incorporated by reference in their entireties.

TECHNICAL FIELD

The present invention relates to the field of power electronic technologies, and in particular, to a phase alignment circuit and method of a receive end, and a receive end.

BACKGROUND

With intensification of energy shortages and environmental pollution in the modern society, electric vehicles have attracted wide attention from all walks of life as new energy vehicles. However, most of existing electric vehicles are limited by battery capacities and have a relatively short driving distance. In addition, the electric vehicle has a long battery charging time and corresponding charging station resources are scarce. This has become a biggest bottleneck restricting application and popularization of the electric vehicles.

Battery charging methods for electric vehicles usually include: contact charging and wireless charging. During contact charging, electricity is conducted through metal contact between a plug and a socket. During wireless charging, a coupled electromagnetic field is used as a medium to transfer electrical energy. Compared with contact charging, wireless charging has many advantages and becomes a mainstream manner for charging electric vehicles in the future.

A wireless charging system has undergone a development process of a non-tuning method for adjusting output power by using a direct current conversion circuit, passive tuning for adjusting output power by using passive components such as an inductor and a capacitor, and performing an impedance adjustment by using a controllable switching transistor.

The impedance adjustment is to control synchronization between a bridge arm voltage of a rectifier of a receive end and an input current of the rectifier. Therefore, a phase of the input current of the rectifier needs to be detected. However, because the input current of the rectifier generally has a harmonic signal or an interference signal, the detected input current needs to be filtered. Regardless of whether the filtering is hardware filtering or software filtering, a phase existing after the filtering lags behind the phase existing before the filtering.

SUMMARY

To resolve the foregoing technical problem existing in the prior art, the present invention provides a phase alignment circuit and method of a receive end, and a receive end, so that a phase lag caused due to filtering can be compensated for, to keep accurate synchronization between a bridge arm voltage of a rectifier and an input current of the rectifier.

According to a first aspect, an embodiment of this application provides a phase alignment circuit of a receive end, including: a phase measurement circuit and a controller. A first input end of the phase measurement circuit is connected to an output end of a current detection circuit, and a second input end of the phase measurement circuit is connected to an output end of a filter. The current detection circuit detects an input current of a rectifier. The filter filters the input current to obtain an input current fundamental component. The phase measurement circuit obtains a difference between a phase of the input current and a phase of the input current fundamental component. The controller uses, as an actual phase shift angle, a result obtained by subtracting the phase difference from a preset phase shift angle, and controls a phase of a bridge arm voltage of the rectifier to lag behind the phase of the input current fundamental component by the actual phase shift angle.

The phase alignment circuit can compensate for a phase lag caused due to filtering, to keep accurate synchronization between the bridge arm voltage of the rectifier and the input current of the rectifier. When the phase of the bridge arm voltage is controlled by using the phase of the input current as a reference, a phase difference caused due to a filtering delay needs to be subtracted from the preset phase shift angle between the bridge arm voltage that needs to be theoretically controlled and the input current, to compensate for the phase difference caused due to filtering. The controller outputs a drive signal for a controllable switching transistor of the rectifier by using the actual phase shift angle. Because a lagging phase caused due to filtering is compensated for, precision of synchronization between the bridge arm voltage and the input current can be increased.

The phase measurement circuit may be digital or analog. For example, when the phase measurement circuit is a digital phase detector, the phase alignment circuit further includes: a first zero-crossing detector and a second zero-crossing detector. An input end of the first zero-crossing detector is connected to the output end of the filter, and an input end of the second zero-crossing detector is connected to the output end of the current detection circuit. An output end of the first zero-crossing detector is connected to a first input end of the digital phase detector, and an output end of the second zero-crossing detector is connected to a second input end of the digital phase detector. The first zero-crossing detector is configured to perform zero-crossing detection on the input current fundamental component, to obtain a first square wave. The second zero-crossing detector is configured to perform zero-crossing detection on the input current, to obtain a second square wave. The digital phase detector is configured to obtain the difference between the phase of the input current and the phase of the input current fundamental component based on the first square wave and the second square wave. The digital phase detector may directly obtain a difference between phases of the two square wave signals, that is, obtain a phase difference in a form of a digital signal, and directly send the phase difference to the controller. The controller may directly process the digital signal, thereby saving resources of the controller.

When the phase measurement circuit is an analog phase detector, the phase alignment circuit further includes: an analog to digital converter. A first input end of the analog phase detector is connected to the output end of the current detection circuit, and a second input end of the analog phase detector is connected to the output end of the filter. The analog to digital converter is configured to perform analog to digital conversion on a phase difference that is output by the analog phase detector, to obtain a phase difference in a form of a digital signal. Because the analog phase detector can receive an analog signal, the analog phase detector can directly process a sine signal. Therefore, no zero-crossing detector needs to perform zero-crossing detection to obtain a square wave signal.

In an embodiment, the analog to digital converter and the controller are integrated together. In other words, the controller may have its own analog to digital converter.

In an embodiment, the rectifier is a full-bridge rectifier, and the full-bridge rectifier includes four controllable switching transistors. The bridge arm voltage is a voltage between a middle point of a leading bridge arm of the full-bridge rectifier and a middle point of a lagging bridge arm of the full-bridge rectifier. The rectifier is a half-bridge rectifier, and the half-bridge rectifier includes two controllable switching transistors. The bridge arm voltage is a voltage between a middle point of a bridge arm of the half-bridge rectifier and the ground.

In an embodiment, the preset phase shift angle is 0, or the preset phase shift angle is a fixed preset value greater than 0.

According to a second aspect, an embodiment of this application provides a phase alignment method of a receive end, where the method is applied to the foregoing phase alignment circuit, and includes: detecting an input current of a rectifier; filtering the input current of the rectifier to obtain an input current fundamental component; obtaining a difference between a phase of the input current and a phase of the input current fundamental component; and using, as an actual phase shift angle, a result obtained by subtracting the phase difference from a preset phase shift angle, and controlling a phase of a bridge arm voltage of the rectifier to lag behind the phase of the input current fundamental component by the actual phase shift angle.

Based on the method, a phase lag caused due to filtering can be compensated for, to keep accurate synchronization between the bridge arm voltage of the rectifier and the input current of the rectifier. When the phase of the bridge arm voltage is controlled by using the phase of the input current as a reference, a phase difference caused due to a filtering delay needs to be subtracted from the preset phase shift angle between the bridge arm voltage that needs to be theoretically controlled and the input current, to compensate for the phase difference caused due to filtering. A drive signal for a controllable switching transistor of the rectifier is output by using the actual phase shift angle. Because a lagging phase caused due to filtering is compensated for, precision of synchronization between the bridge arm voltage and the input current can be increased.

According to a third aspect, an embodiment of this application further provides a receive end, including: a receiving coil, a rectifier, and the foregoing phase alignment circuit. The receiving coil receives electromagnetic energy transmitted by a transmitting coil and outputs an alternating current. The rectifier rectifies the alternating current into a direct current. The phase alignment circuit aligns a phase of a bridge arm voltage of the rectifier based on a difference between a phase of an input current existing before filtering and a phase of an input current existing after the filtering of the rectifier.

The receive end may be applied to a wireless charging system, and the wireless charging system may charge an electric vehicle. The receive end may be located on the electric vehicle, and charge a power battery pack on the electric vehicle.

The rectifier is a full-bridge rectifier or a half-bridge rectifier. When the rectifier is the full-bridge rectifier, four controllable switching transistors may be included, or only two controllable switching transistors may be included. When the rectifier is the half-bridge rectifier, two included switching transistors are both controllable switching transistors.

Compared with the prior art, the present invention has at least the following advantages:

The phase lag caused due to filtering can be compensated for, to keep accurate synchronization between the bridge arm voltage of the rectifier and the input current of the rectifier. Specifically, a phase existing after filtering lags behind an actual phase of the input current, and the phase of the bridge arm voltage is also usually enabled to lag behind the phase of the input current; or certainly, the phase of the bridge arm voltage may be the same as the phase of the input current. Therefore, when the phase of the bridge arm voltage is controlled by using the phase of the input current as a reference, the phase difference caused due to the filtering delay needs to be subtracted from the preset phase shift angle between the bridge arm voltage that needs to be theoretically controlled and the input current, to compensate for the phase difference caused due to filtering. The controller outputs the drive signal for the controllable switching transistor of the rectifier by using the actual phase shift angle. Because the lagging phase caused due to filtering is compensated for, precision of synchronization between the bridge arm voltage and the input current can be increased.

BRIEF DESCRIPTION OF DRAWINGS

To describe the technical solutions in the embodiments of this application more clearly, the following briefly describes the accompanying drawings required for describing the embodiments or the prior art. Apparently, the accompanying drawings in the following description show some embodiments of this application, and a person of ordinary skill in the art may still derive other drawings from these accompanying drawings without creative efforts.

DESCRIPTION OF EMBODIMENTS

To enable a person skilled in the art to better understand technical solutions provided in the embodiments of this application, an application scenario of the embodiments of this application is first described below.

Figure 1:
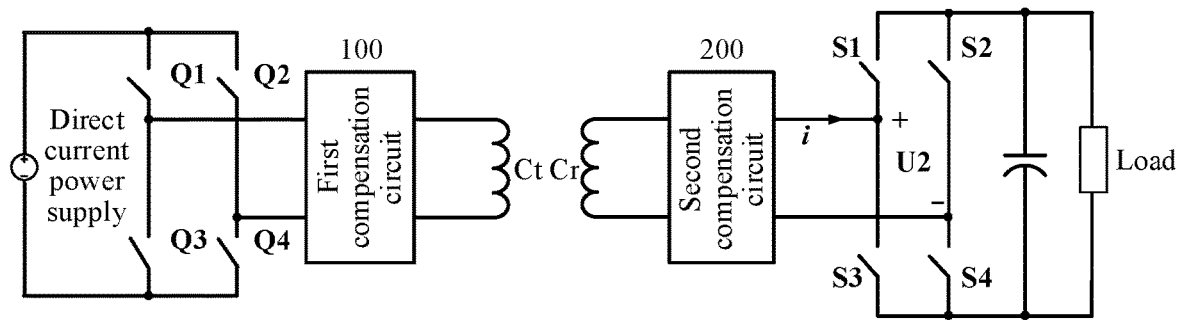
FIG. 1 is an equivalent circuit diagram of a wireless charging system.

FIG. 1 is an equivalent circuit diagram of a wireless charging system.

The wireless charging system includes a transmit end and a receive end. The transmit end includes an inverter, a compensation circuit 100, and a transmitting coil Ct. The inverter includes four switching transistors Q1 to Q4.

The receive end includes a receiving coil Cr, a compensation circuit 200, and a rectifier. The rectifier includes four switching transistors S1 to S4.

Electromagnetic energy is usually wirelessly transferred between the transmit end and the receive end. In other words, the transmit end transmits electromagnetic energy, and the receive end receives, through wireless communication, the electromagnetic energy transmitted by the transmit end.

During an impedance adjustment, the rectifier of the receive end needs to be controlled, to control synchronization between a bridge arm voltage of the rectifier and an input current i of the rectifier. The rectifier may be a full-bridge rectifier or a half-bridge rectifier. FIG. 1 shows the full-bridge rectifier. The full-bridge rectifier includes four switching transistors. In this case, the bridge arm voltage of the rectifier is a voltage between middle points of two bridge arms of the rectifier, that is, U2 in the figure. When the rectifier is the half-bridge rectifier, the bridge arm voltage is a voltage between a middle point of a bridge arm of the rectifier and the ground.

Keeping synchronization between the bridge arm voltage of the rectifier and the input current of the rectifier means that cycles or frequencies of the two are the same. In a process of keeping synchronization between the cycle of the bridge arm voltage and the cycle of the input current, a fixed phase difference may be kept between the two. The fixed phase difference may be 0, or may be a preset fixed value greater than 0.

If the cycles or frequencies of the two are the same, a phase of the input current of the rectifier needs to be obtained, to obtain the cycle of the input current, so that the bridge arm voltage follows the cycle of the input current.

However, when the phase of the input current of the rectifier is detected, because the input current of the rectifier generally has a harmonic signal or an interference signal, the detected input current needs to be filtered. Regardless of whether the filtering is hardware filtering or software filtering, a phase existing after the filtering lags behind the phase existing before the filtering.

Therefore, based on a phase alignment circuit and method and a system that are provided in the embodiments of this application, a phase lag caused due to filtering can be compensated for, to keep accurate synchronization between the bridge arm voltage of the rectifier and the input current of the rectifier. In an embodiment, the phase existing after the filtering lags behind an actual phase of the input current, and in a controller, a phase of the bridge arm voltage is also usually enabled to lag behind the phase of the input current; or certainly, a phase of the bridge arm voltage may be the same as the phase of the input current. Therefore, when the phase of the bridge arm voltage is controlled by using the phase of the input current as a reference, a phase difference caused due to a filtering delay needs to be subtracted from a preset phase shift angle between the bridge arm voltage that needs to be theoretically controlled and the input current, to compensate for the phase difference caused due to filtering.

To make a person skilled in the art understand the technical solutions in the present invention better, the following clearly describes the technical solutions in the embodiments of the present invention with reference to the accompanying drawings in the embodiments of the present invention. Apparently, the described embodiments are merely some rather than all of the embodiments of the present invention. All other embodiments obtained by a person of ordinary skill in the art based on the embodiments of the present invention without creative efforts shall fall within the protection scope of the present invention.

Alignment Circuit Embodiment 1

Figure 2:
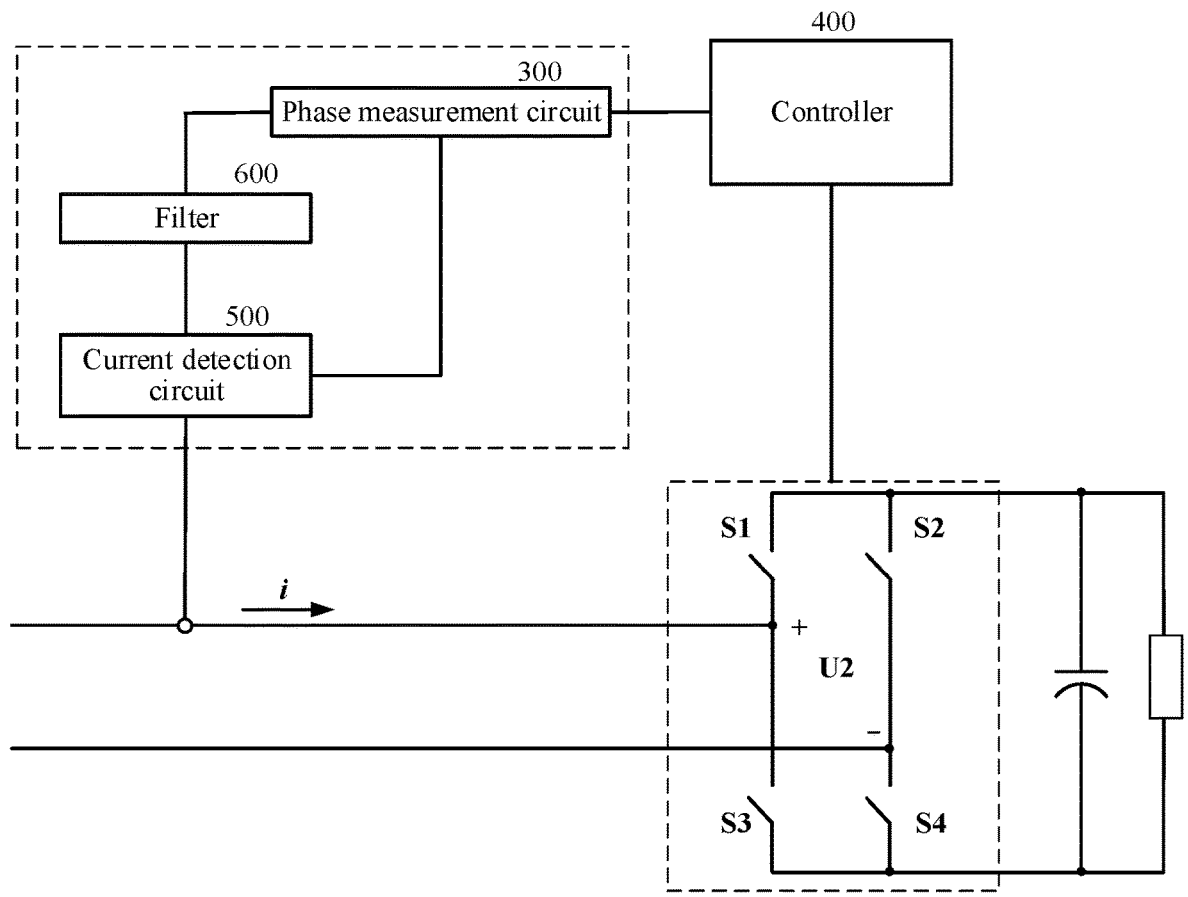
FIG. 2 is a schematic diagram of a phase alignment circuit according to an embodiment of this application.

FIG. 2 is a schematic diagram of a phase alignment circuit according to an embodiment of this application.

An example in which a rectifier is a full-bridge rectifier is used in this embodiment for description. As shown in FIG. 2, the rectifier includes controllable switching transistors S1 to S4. A bridge arm voltage of the rectifier is U2.

The phase alignment circuit for an impedance adjustment provided in this embodiment includes a phase measurement circuit 300 and a controller 400.

A first input end of the phase measurement circuit 300 is connected to an output end of a current detection circuit 500, and a second input end of the phase measurement circuit 300 is connected to an output end of a filter 600.

The current detection circuit 500 detects an input current of the rectifier.

A specific implementation of the current detection circuit 500 is not limited in this embodiment of this application, and for example, the current detection circuit 500 may be a Hall effect sensor or a current transformer (CT).

The filter 600 filters the input current to obtain an input current fundamental component.

A main role of the filter 600 is to filter out a high-order harmonic in the input current and retain the input current fundamental component.

The filter 600 may use a relatively mature filter circuit.

The phase measurement circuit 300 obtains a difference between a phase of the input current and a phase of the input current fundamental component.

The phase measurement circuit 300 may be implemented by using a phase detector, or may be implemented by using a circuit built by a basic circuit device, and is mainly configured to obtain a difference between phases of two input signals.

The controller 400 uses, as an actual phase shift angle, a result obtained by subtracting the phase difference from a preset phase shift angle, and controls a phase of the bridge arm voltage of the rectifier to lag behind the phase of the input current fundamental component by the actual phase shift angle.

For ease of description, the preset phase shift angle is represented by δ and the phase difference is represented by β in the following.

The filter causes a delay to the phase of the input current. Therefore, when generating a drive signal for a controllable switching transistor of the rectifier, the controller needs to compensate for a phase difference caused due to the delay. Keeping synchronization between the bridge arm voltage of the rectifier and the input current of the rectifier means keeping synchronization with the input current existing before the filtering.

Before filtering, the input current of the rectifier is a sine signal including a harmonic. After filtering, the input current becomes a sine signal. However, a phase of the sine signal existing after filtering lags behind, by the phase difference β, a phase of the sine signal existing before filtering.

If the preset phase shift angle between the bridge arm voltage of the rectifier and the input current of the rectifier is δ, a phase shift angle of the bridge arm voltage to the input current fundamental component needs to be actually controlled to be δ−β.

The preset phase shift angle δ is a preset value, and may be 0 or may be a fixed preset value.

Based on the alignment circuit provided in this embodiment, an input current existing before filtering and an input current existing after the filtering the rectifier are obtained, to obtain a difference between a phase of the input current existing before the filtering and a phase of the input current existing after the filtering. Because the phase difference is caused due to filtering, the phase difference needs to be subsequently controlled to be compensated for. In this embodiment, the controller uses, as the actual phase shift angle, the result obtained by subtracting the phase difference from the preset phase shift angle, and controls the phase of the bridge arm voltage of the rectifier to lag behind the phase of the input current fundamental component by the actual phase shift angle. The controller outputs the drive signal for the controllable switching transistor of the rectifier by using the actual phase shift angle. Because a lagging phase caused due to filtering is compensated for, precision of synchronization between the bridge arm voltage and the input current can be increased.

Alignment Circuit Embodiment 2

Figure 3:
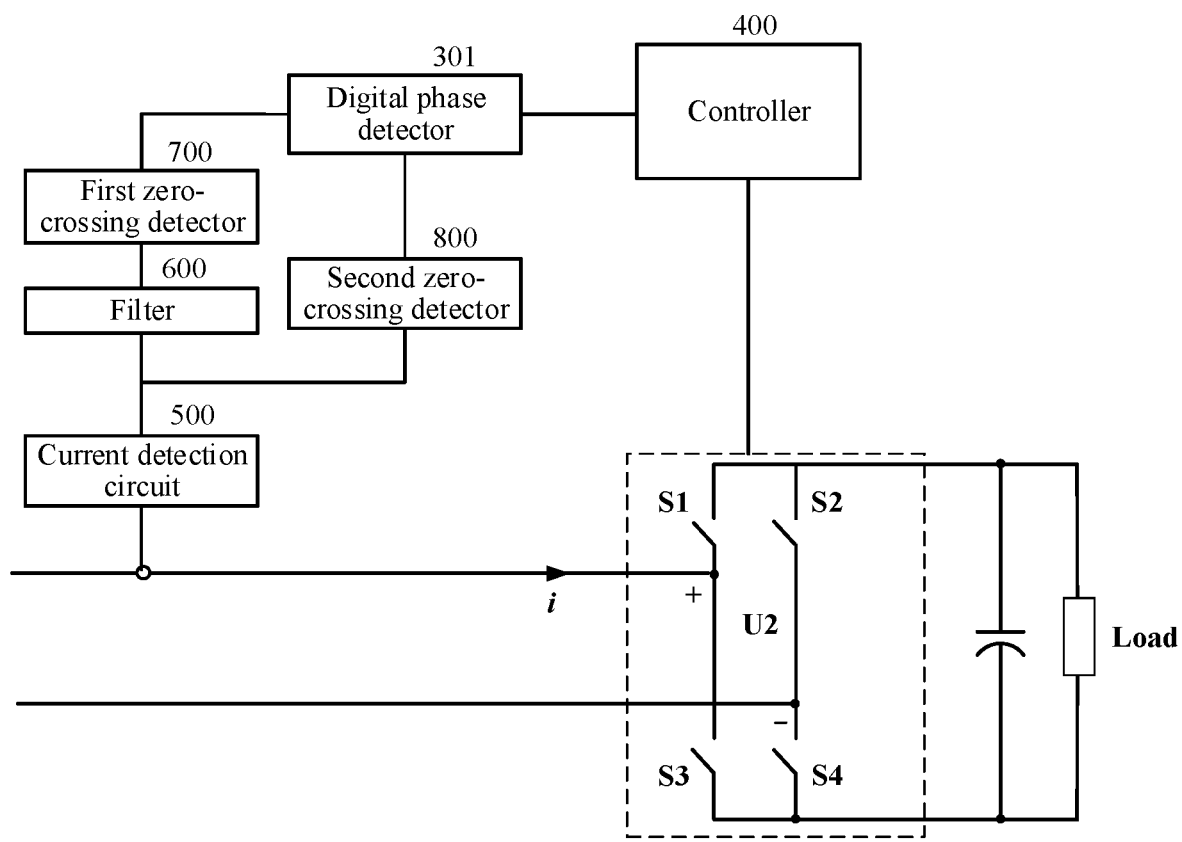
FIG. 3 is a schematic diagram of another phase alignment circuit according to an embodiment of this application.

FIG. 3 is a schematic diagram of another phase alignment circuit according to an embodiment of this application.

In the phase alignment circuit provided in this embodiment, the phase measurement circuit may be a digital phase detector 301.

The phase alignment circuit further includes: a first zero-crossing detector 700 and a second zero-crossing detector 800.

An input end of the first zero-crossing detector 700 is connected to the output end of the filter 600, and an input end of the second zero-crossing detector 800 is connected to the output end of the current detection circuit 500. An output end of the first zero-crossing detector 700 is connected to a first input end of the digital phase detector 301, and an output end of the second zero-crossing detector 800 is connected to a second input end of the digital phase detector 301.

The first zero-crossing detector 700 is configured to perform zero-crossing detection on the input current fundamental component, to obtain a first square wave.

The second zero-crossing detector 800 is configured to perform zero-crossing detection on the input current, to obtain a second square wave.

The current detection circuit 500 outputs a sine signal having a harmonic, and the filter 600 outputs a sine signal. Because only a digital signal can be processed when the phase measurement circuit uses the digital phase detector 301, an analog signal corresponding to a sine signal needs to be converted into a digital signal. Therefore, in this embodiment of this application, a sine signal is converted into a square wave signal with a same phase and cycle by using a zero-crossing detector. Because the square wave signal belongs to a digital signal, the square wave signal can be directly processed by the digital phase detector 301.

The digital phase detector 301 is configured to obtain a difference between a phase of the input current and a phase of the input current fundamental component based on the first square wave and the second square wave.

The digital phase detector 301 may obtain a difference between phases of the two square wave signals, and the phase difference is a difference between phases of input currents that is caused by the filter.

In an embodiment, a difference between a phase of an input current existing before filtering and a phase of an input current existing after the filtering is obtained by using the digital phase detector 301. Because a signal received by the digital phase detector 301 needs to be a digital signal and an analog signal cannot be processed, the first zero-crossing detector 700 and the second zero-crossing detector 800 need to separately perform zero-crossing detection to convert a sine signal into a square wave signal. The digital phase detector 301 may directly obtain the difference between the phases of the two square wave signals, that is, obtain a phase difference in a form of a digital signal, and directly send the phase difference to the controller 400. The controller 400 may directly process the digital signal, thereby saving resources of the controller 400.

Remaining content of this embodiment is the same as that in Embodiment 1 of the phase alignment circuit. Details are not described herein.

Embodiment 2 of the alignment circuit is described by using an example in which the phase measurement circuit is the digital phase detector, and an implementation in which the phase measurement circuit is an analog phase detector is described below.

Phase Alignment Circuit Embodiment 3

Figure 4:
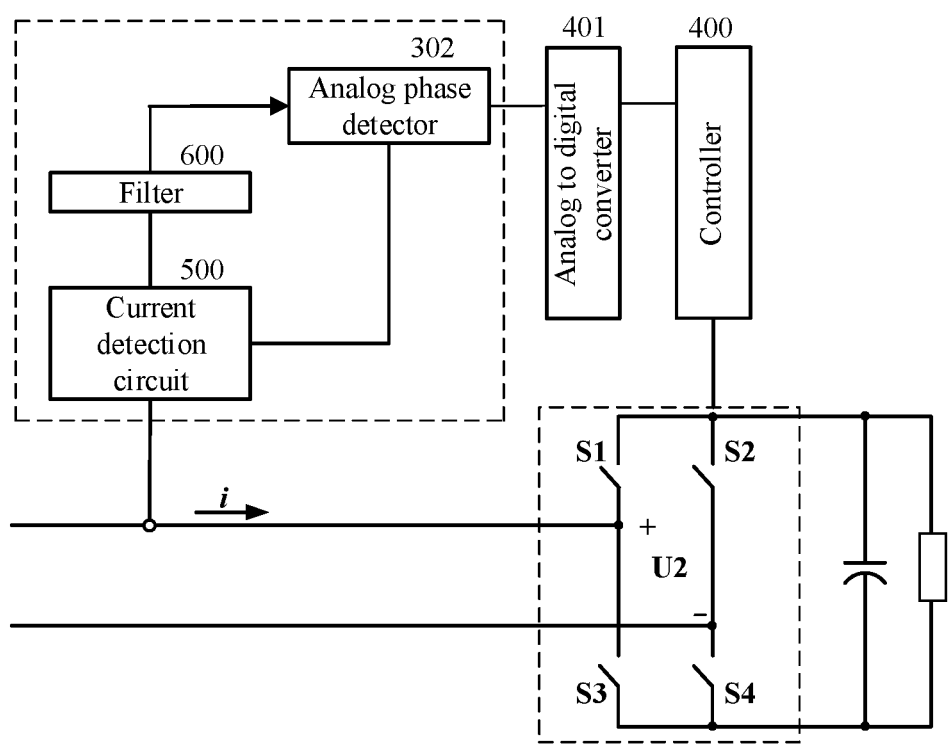
FIG. 4 is a schematic diagram of still another phase alignment circuit according to an embodiment of this application.

FIG. 4 is a schematic diagram of still another phase alignment circuit according to an embodiment of this application.

In the phase alignment circuit provided in this embodiment, the phase measurement circuit is an analog phase detector 302.

The phase alignment circuit further includes an analog to digital converter 401.

A first input end of the analog phase detector 302 is connected to the output end of the current detection circuit 500, and a second input end of the analog phase detector 302 is connected to the output end of the filter 600.

The analog to digital converter 401 is configured to: perform analog to digital conversion on a phase difference that is output by the analog phase detector 302, convert the phase difference into a phase difference in a form of a digital signal, and send the phase difference in the form of the digital signal to the controller 400.

The controller 400 processes the phase difference in the form of the digital signal.

According to the phase alignment circuit provided in this embodiment, a difference between a phase of an input current existing before filtering and a phase of an input current existing after the filtering is obtained by using the analog phase detector 302. Because the analog phase detector 302 can receive an analog signal, the analog phase detector 302 can directly process a sine signal. Therefore, no zero-crossing detector needs to perform zero-crossing detection to obtain a square wave signal. Because the analog phase detector 302 outputs a phase difference in a form of an analog signal, the analog to digital converter needs to convert the phase difference into a phase difference in a form of a digital signal, and then the controller 400 can directly process the phase difference.

Figure 5:
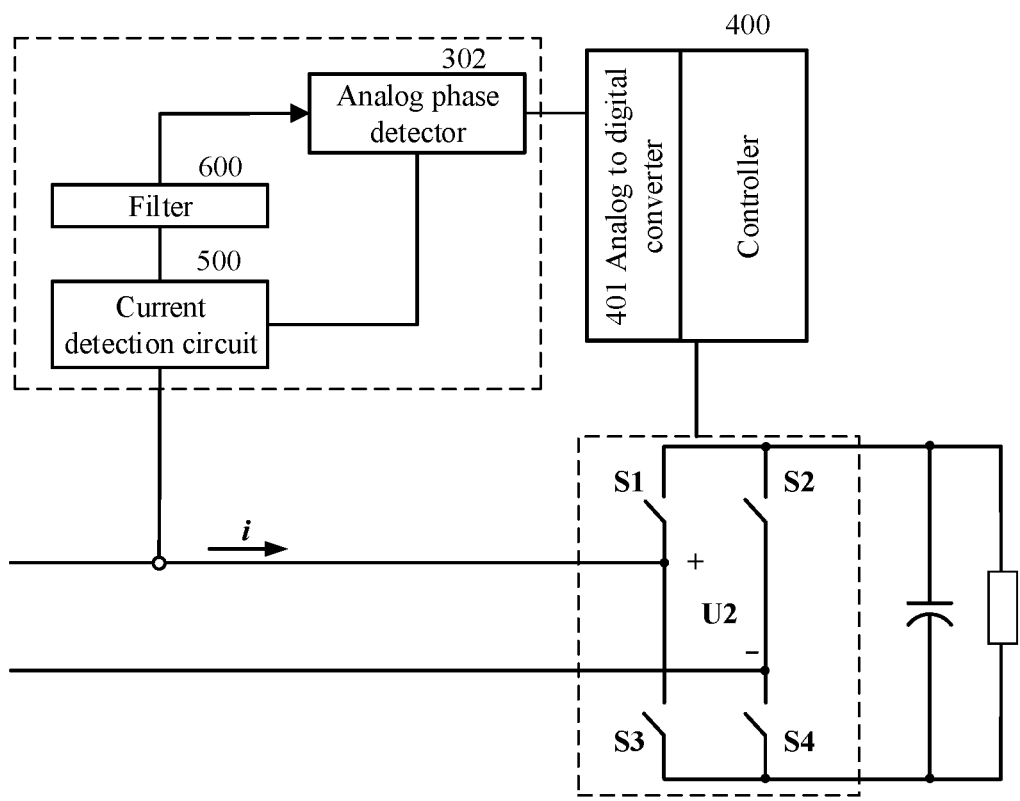
FIG. 5 is a schematic diagram of yet another phase alignment circuit according to an embodiment of this application.

It may be understood that the analog to digital converter 401 and the controller 400 may be integrated together, that is, the analog to digital converter 401 is integrated in the controller 400. For details, refer to the circuit diagram shown in FIG. 5.

To enable a person skilled in the art to more intuitively understand the technical solutions provided in the embodiments of this application, detailed descriptions are provided below with reference to a waveform graph corresponding to FIG. 3.

Figure 6:
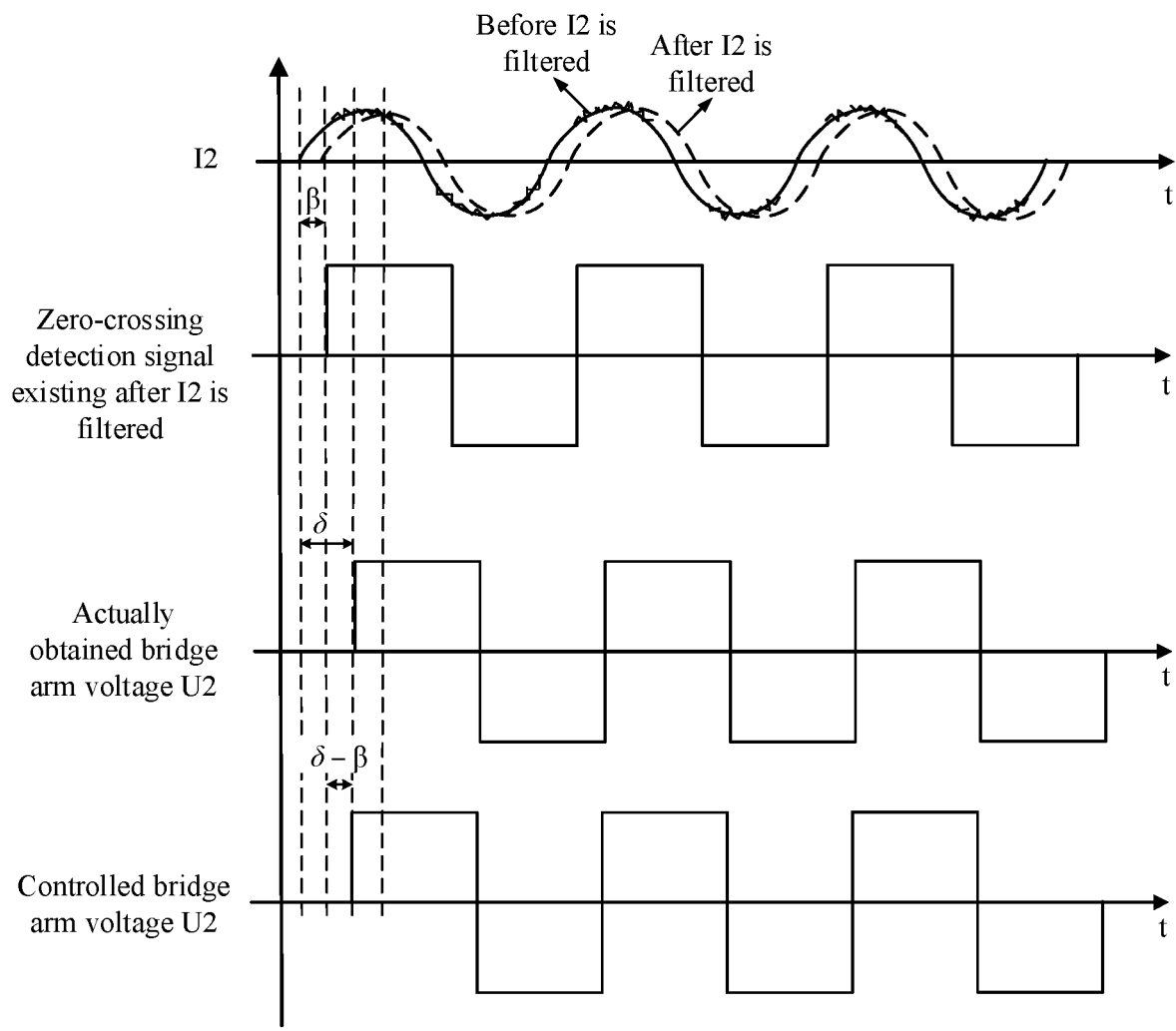
FIG. 6 is a phase alignment waveform graph according to an embodiment of this application.

FIG. 6 is a phase alignment waveform graph according to an embodiment of this application.

It can be seen from FIG. 6 that a waveform of an input current i of a rectifier corresponds to a waveform existing before filtering and a waveform existing after filtering that are both sine waves. A solid line indicates an input current existing before filtering, and a dashed line indicates an input current existing after the filtering.

A square wave that is output by a first zero-crossing detector corresponds to a square wave signal obtained by performing zero-crossing detection on a sine signal existing before i is filtered, and a square wave that is output by a second zero-crossing detector corresponds to a square wave signal obtained by performing zero-crossing detection on a sine signal after i is filtered.

It can be seen from the figure that a phase existing after i is filtered lags, by a phase difference $\beta$, behind a phase existing before i is filtered, in other words, a difference between a phase of a signal that is output by the first zero-crossing detector and a phase of a signal that is output by the second zero-crossing detector is $\beta$.

If an expected phase shift angle between a bridge arm voltage and the input current is a preset phase shift angle $\delta$, if by using a phase of an input current fundamental component existing after filtering as a reference, a phase of the bridge arm voltage is controlled to lag, by $\delta$, behind the phase of the input current fundamental component existing after filtering, a phase difference by which the phase of the bridge arm voltage lags behind a phase of an actual input current fundamental component is $\delta+\beta$. Therefore, the phase shift angle $\delta$ between the phase of the bridge arm voltage and the phase of the input current fundamental component needs to be obtained by using the phase of the input current existing before the filtering as a reference. Therefore, the phase of the input current fundamental component existing after filtering needs to be compensated for, and a result obtained by subtracting the phase difference $\beta$ caused due to filtering from the preset phase shift angle $\delta$ needs to be used as a phase shift angle that is used to actually control a drive signal. In this way, a phase of an actually obtained bridge arm voltage lags behind the phase of the actual input current fundamental component by $\delta$.

The foregoing embodiments are all described by using an example in which the rectifier is the full-bridge rectifier, and the four switching transistors of the full-bridge rectifier are all controllable switching transistors. Other implementations of the rectifier are described below with reference to the accompanying drawings. For example, when the rectifier is the full-bridge rectifier, two controllable switching transistors and two diodes may be included. Detailed descriptions are provided below with reference to the accompanying drawings.

Figure 7:
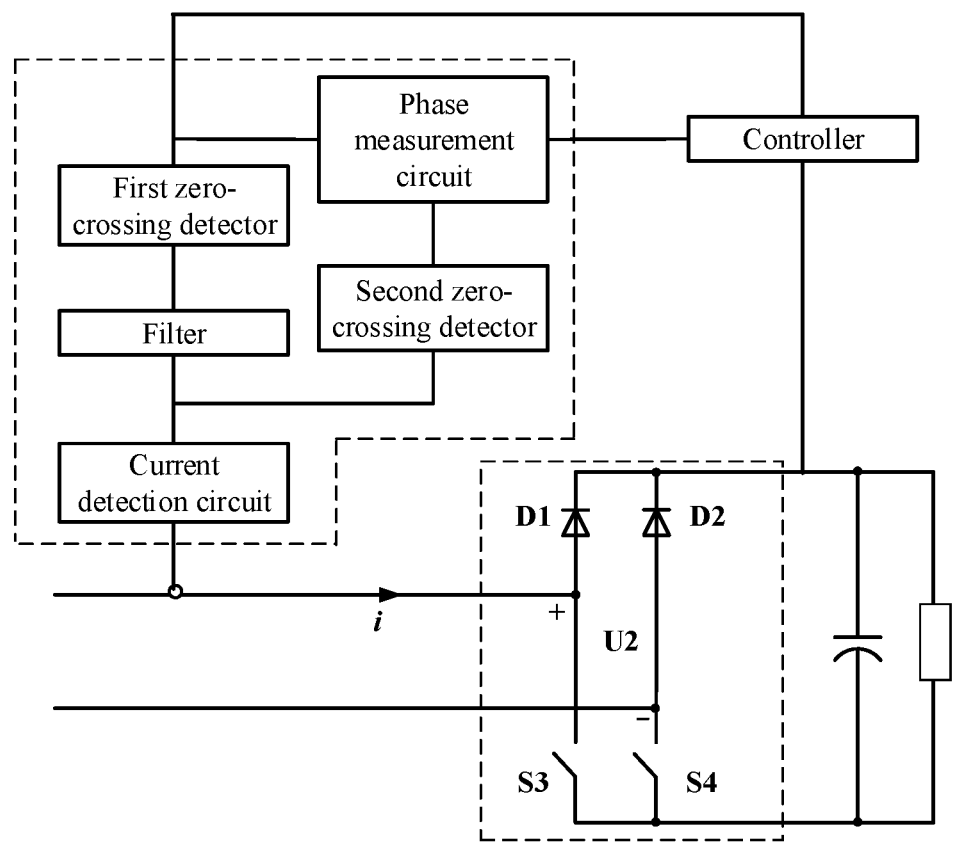
FIG. 7 is a schematic diagram of a rectifier that is a full-bridge rectifier according to an embodiment of this application.

FIG. 7 is a schematic diagram of a rectifier including two controllable switching transistors according to an embodiment of this application.

As shown in FIG. 7, either of two bridge arms of the rectifier includes one controllable switching transistor and one diode. For example, a leading bridge arm includes a first diode D1 and a first controllable switching transistor S3, and a lagging bridge arm includes a second diode D2 and a second controllable switching transistor S4.

Locations of the two diodes and locations of the two controllable switching transistors in FIG. 7 are interchangeable.

Figure 8:
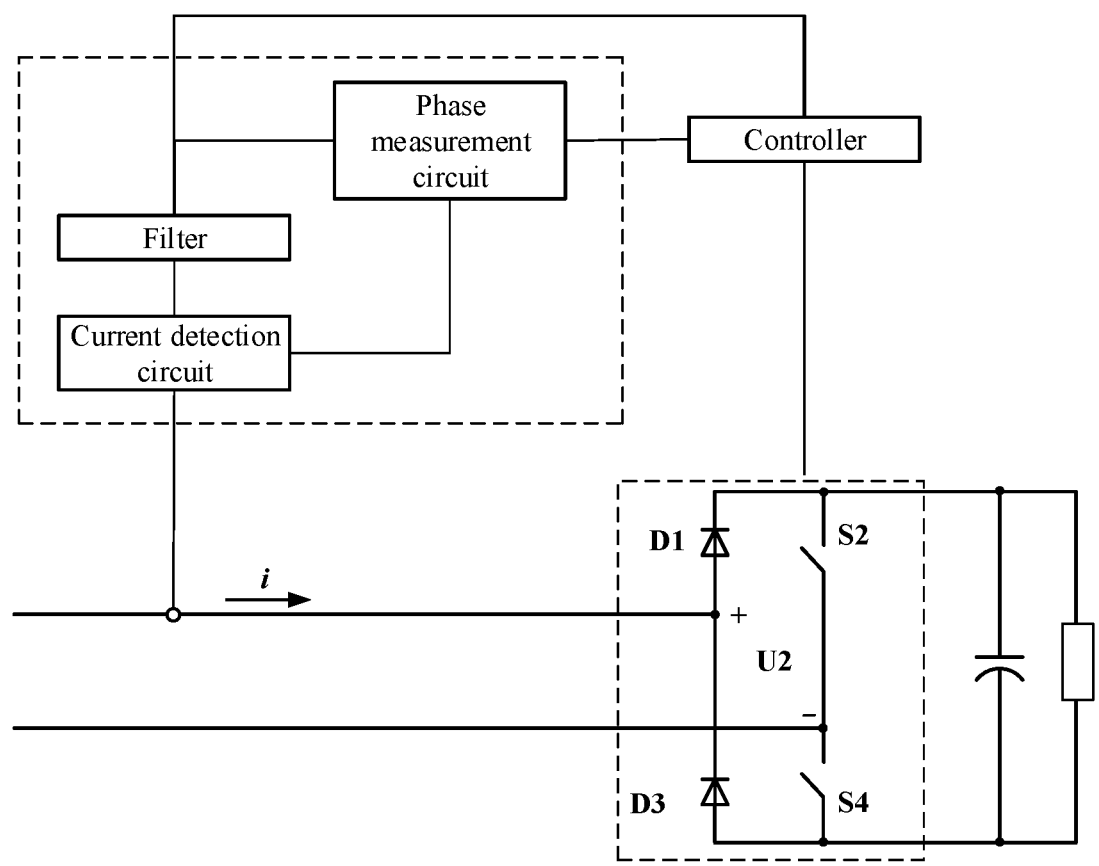
FIG. 8 is another schematic diagram of a rectifier that is a full-bridge rectifier according to an embodiment of this application.

FIG. 8 is another schematic diagram of a rectifier including two controllable switching transistors according to an embodiment of this application.

The rectifier shown in FIG. 8 also includes two diodes and two controllable switching transistors.

One bridge arm includes two diodes D1 and D3, and another bridge arm includes two controllable switching transistors S2 and S4.

It may be understood that locations of switching transistors on the two bridge arms are interchangeable.

The full-bridge rectifier is described above, and a half-bridge rectifier is described below. A bridge arm voltage of the full-bridge rectifier is a voltage between middle points of two bridge arms. A bridge arm voltage of the half-bridge rectifier is a voltage between a middle point of a bridge arm and the ground.

Figure 9:
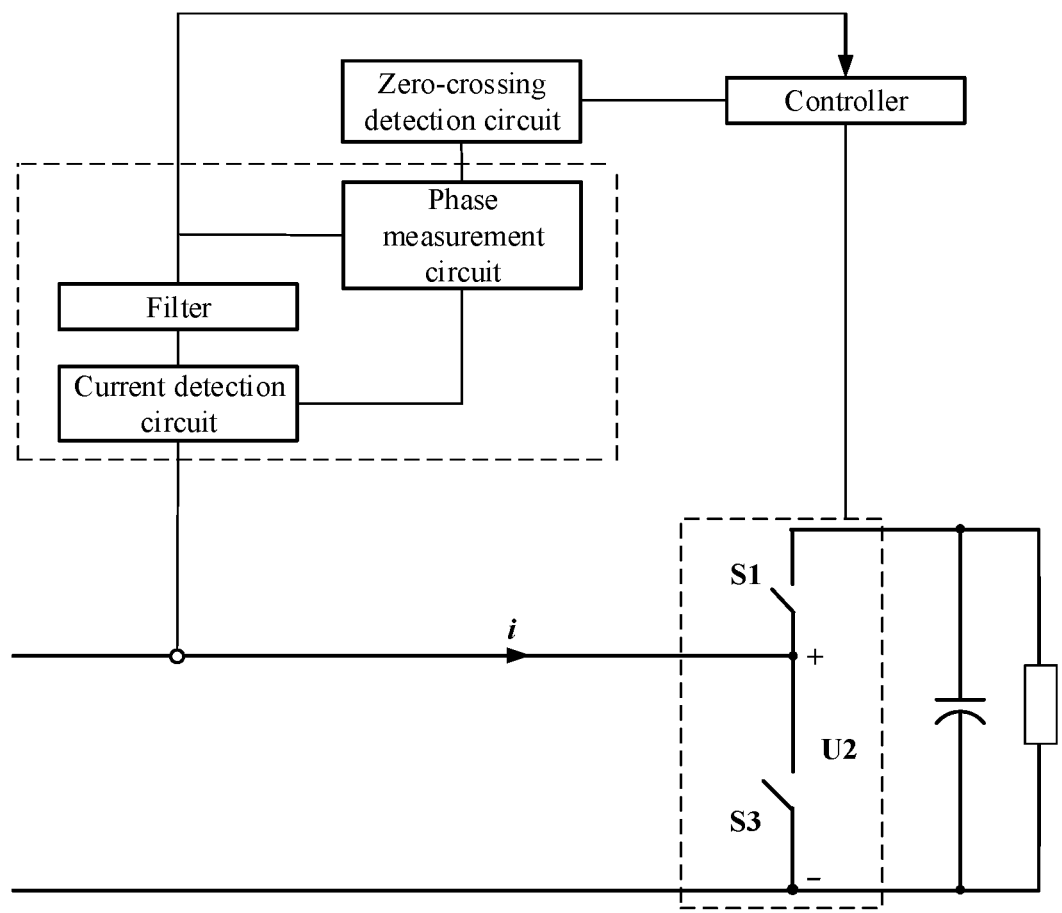
FIG. 9 is a schematic diagram of a rectifier that is a half-bridge rectifier according to an embodiment of this application.

FIG. 9 is a schematic diagram of a rectifier that is a half-bridge rectifier according to an embodiment of this application.

Two switching transistors of the half-bridge rectifier are both controllable switching transistors: S1 and S3 shown in FIG. 9.

A specific implementation of the rectifier is not limited in this embodiment of this application. A person skilled in the art may perform selection depending on an actual product requirement.

Method Embodiment

Based on the phase alignment circuit provided in the foregoing embodiment, this embodiment of this application further provides a phase alignment method. Detailed descriptions are provided below with reference to the accompanying drawing.

Figure 10:
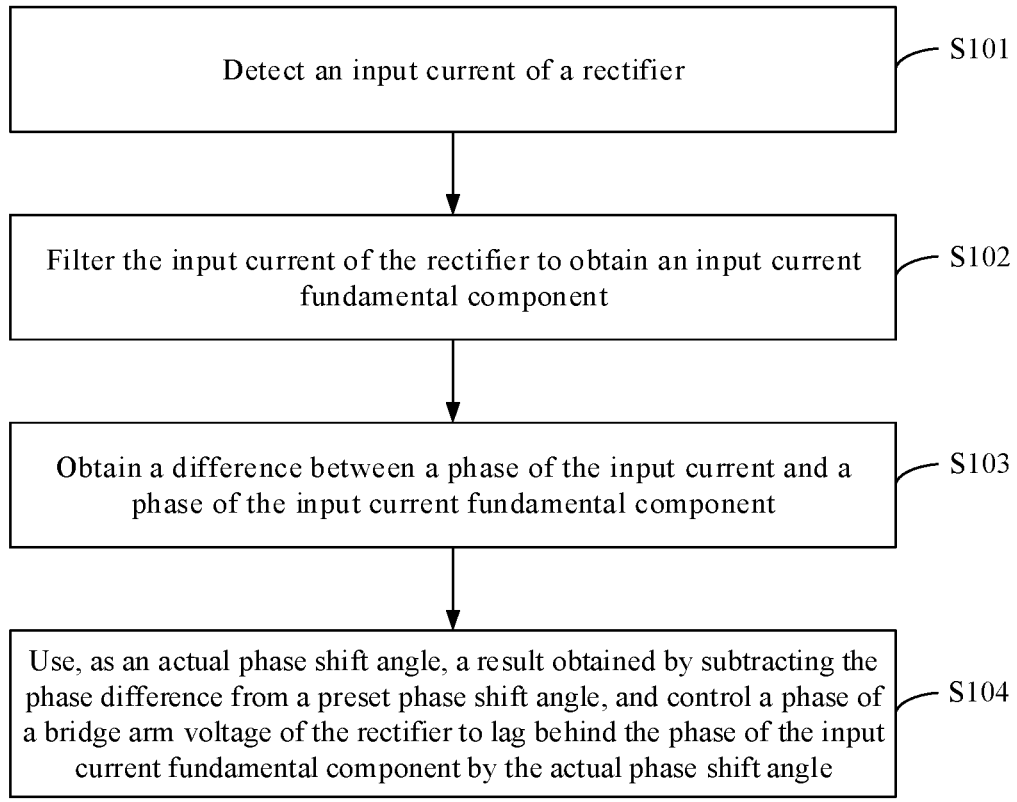
FIG. 10 is a flowchart of a phase alignment method according to an embodiment of this application.

FIG. 10 is a flowchart of a phase alignment method of a receive end according to an embodiment of this application.

The phase alignment method provided in this embodiment is applied to the phase alignment circuit provided in any one of the foregoing embodiments, and includes the following operations.

S101: Detect an input current of a rectifier.

In an embodiment, detection may be performed by using a current sensor. A type of the current sensor is not specifically limited in this embodiment of this application, and for example, the current sensor may be a Hall effect sensor or may be a current transformer.

S102: Filter the input current of the rectifier to obtain an input current fundamental component.

Because the directly detected input current has a harmonic component, the harmonic component needs to be filtered out to obtain the input current fundamental component, and a subsequently to-be-processed object is the input current fundamental component.

S103: Obtain a difference between a phase of the input current and a phase of the input current fundamental component.

A phase delay is caused due to filtering. Therefore, to compensate, in a subsequent operation, for the phase difference caused by the delay, the phase difference needs to be obtained.

S104: Use, as an actual phase shift angle, a result obtained by subtracting the phase difference from a preset phase shift angle, and control a phase of a bridge arm voltage of the rectifier to lag behind the phase of the input current fundamental component by the actual phase shift angle.

An input current existing before filtering and an input current existing after the filtering of the rectifier are obtained, to obtain a difference between a phase of the input current existing before the filtering and a phase of the input current existing after the filtering. Because the phase difference is caused due to filtering, the phase difference needs to be subsequently controlled to be compensated for. In this embodiment, the controller uses, as the actual phase shift angle, the result obtained by subtracting the phase difference from the preset phase shift angle, and controls the phase of the bridge arm voltage of the rectifier to lag behind the phase of the input current fundamental component by the actual phase shift angle. The controller outputs a drive signal for a controllable switching transistor of the rectifier by using the actual phase shift angle. Because a lagging phase caused due to filtering is compensated for, precision of synchronization between the bridge arm voltage and the input current can be increased.

Receive-End Embodiment

Based on the phase alignment circuit and method provided in the foregoing embodiments, this embodiment of this application further provides a receive end of a wireless charging system. Detailed descriptions are provided below with reference to the accompanying drawing.

Figure 11:
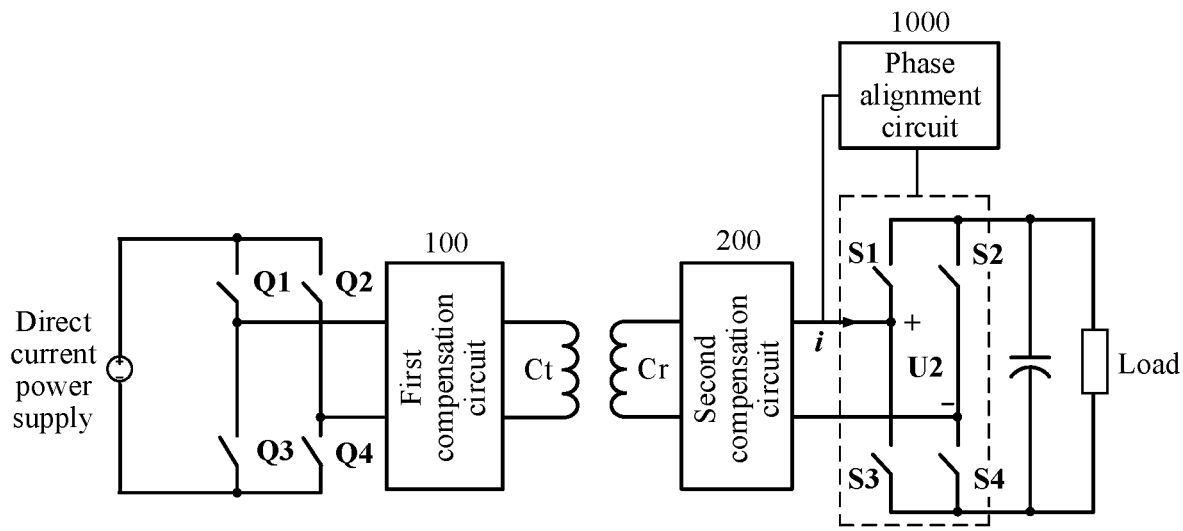
FIG. 11 is a schematic diagram of a wireless charging system according to an embodiment of this application.

FIG. 11 is a schematic diagram of a wireless charging system according to an embodiment of this application.

It may be understood that the wireless charging system may be applied to various fields in which wireless charging is required, for example, the electric vehicle field. A receive end may be located on an electric vehicle and be used as a vehicle-mounted terminal. However, a transmit end of the wireless charging system may be located on the ground, and the transmit end wirelessly charges the electrical vehicle. Specifically, a transmitting coil of the transmit end transmits an alternating magnetic field, and a receiving coil of the receive end receives the alternating magnetic field, so as to exchange electromagnetic energy.

As shown in FIG. 11, the wireless charging system provided in this embodiment includes the receive end and the transmit end, and the receive end includes an inverter, a first compensation circuit 100, and a transmitting coil Ct. The inverter includes four controllable switching transistors Q1 to Q4.

The receive end includes: a receiving coil Cr, a second compensation circuit 200, a rectifier, and the phase alignment circuit 1000 described in any one of the foregoing embodiments. The rectifier is described by using an example of a full-bridge rectifier including four controllable switching transistors S1 to S4.

The receiving coil Cr receives electromagnetic energy transmitted by the transmitting coil Ct and outputs an alternating current.

The rectifier rectifies the alternating current into a direct current to supply power to a powered device. For example, in the electric vehicle field, load of the rectifier may be a power battery on an electric vehicle.

In an embodiment, the phase alignment circuit 1000 may align a phase of a bridge arm voltage of the rectifier based on a difference between a phase of an input current existing before filtering and a phase of an input current existing after the filtering of the rectifier.

In addition to the full-bridge rectifier shown in FIG. 11, the rectifier may alternatively be a half-bridge rectifier.

The receive end provided in this embodiment obtains the input current existing before the filtering and the input current existing after the filtering of the rectifier, to obtain the difference between the phase of the input current existing before the filtering and the phase of the input current existing after the filtering. Because the phase difference is caused due to filtering, the phase difference needs to be subsequently controlled to be compensated for. In this embodiment, a result obtained by subtracting the phase difference from a preset phase shift angle is used as an actual phase shift angle, and the phase of the bridge arm voltage of the rectifier is controlled to lag behind a phase of an input current fundamental component by the actual phase shift angle. The controller outputs a drive signal for a controllable switching transistor of the rectifier by using the actual phase shift angle. Because a lagging phase caused due to filtering is compensated for, precision of synchronization between the bridge arm voltage of the rectifier and the input current can be increased.

An embodiment of this application further provides a wireless charging system including the receive end described in the foregoing embodiment. The wireless charging system may be applied to the electric vehicle field.

It should be understood that, in this application, "at least one (item)" means one or more, and "a plurality of" means two or more than two. "And/or" is used to describe an association relationship between associated objects and represents that three relationships may exist. For example, "A and/or B" may represent: Only A exists, only B exists, and both A and B exist. Either of A and B may be singular or plural. The character "/" generally indicates an "or" relationship between the associated objects. "At least one (item) of the following" or a similar expression thereof refers to any combination of the items, including any combination of one or more (items). For example, at least one (item) of a, b, or c may indicate: a, b, c, "a and b", "a and c", "b and c", or "a, b, and c". Each of a, b, and c may be singular or plural.

The foregoing are merely embodiments of the present invention, and are not intended to limit the present invention in any form. Although the present invention has been disclosed as above with preferred embodiments, it is not intended to limit the present invention. By using the method and the technical content disclosed above, any person of ordinary skill in the art can make a plurality of possible changes and modifications to the technical solutions of the present invention, or amend the technical solutions thereof to be embodiments with equal effects through equivalent variations without departing from the protection scope of the technical solutions of the present invention. Therefore, without departing from the content of the technical solutions of the present invention, any simple modification, equivalent change, and modification made to the foregoing embodiments according to the technical essence of the present invention still fall within the protection scope of the technical solutions of the present invention.

What is claimed is:

1. A phase alignment circuit of a receive end, comprising:
a phase measurement circuit having a first input end and a second input end, the first input end being connected to an output end of a current detection circuit, the second input end being connected to an output end of a filter, wherein the current detection circuit is to detect an input current of a rectifier, and the filter is to filter the input current to obtain an input current fundamental component, and wherein the phase measurement circuit is further to obtain a phase difference between a phase of the input current and a phase of the input current fundamental component, wherein the phase measurement circuit is a digital phase detector;

a controller configured to:
determine an actual phase shift angle by subtracting the phase difference from a preset phase shift angle, and
control a phase of a bridge arm voltage of the rectifier to lag behind the phase of the input current fundamental component by the actual phase shift angle;

a first zero-crossing detector having an input end connected to the output end of the filter and an output end connected to a first input end of the digital phase detector, wherein the first zero-crossing detector is to perform zero-crossing detection on the input current fundamental component to obtain a first square wave; and a second zero-crossing detector having an input end connected to the output end of the current detection circuit and an output end connected to a second input end of the digital phase detector, wherein the second zero-crossing detector is to perform zero-crossing detection on the input current to obtain a second square wave, wherein the digital phase detector is configured to obtain the phase difference between the phase of the input current and the phase of the input current fundamental component based on the first square wave and the second square wave.

2. The phase alignment circuit according to claim 1, wherein the rectifier is a full-bridge rectifier comprising four controllable switching transistors, and wherein the bridge arm voltage is a voltage between a middle point of a leading bridge arm of the full-bridge rectifier and a middle point of a lagging bridge arm of the full-bridge rectifier.

3. The phase alignment circuit according to claim 1, wherein the rectifier is a half-bridge rectifier comprising two controllable switching transistors, and wherein the bridge arm voltage is a voltage between a middle point of a bridge arm of the half-bridge rectifier and the ground.

4. The phase alignment circuit according to claim 1, wherein the preset phase shift angle is 0, or the preset phase shift angle is a fixed preset value greater than 0.

5. A receive end, comprising: a receiving coil and the phase alignment circuit according to claim 1, wherein
the receiving coil is configured to receive electromagnetic energy transmitted by a transmitting coil and output an alternating current; and
the rectifier is configured to rectify the alternating current into a direct current.

6. The receive end according to claim 5, wherein the rectifier is a full-bridge rectifier or a half-bridge rectifier.

7. A phase alignment method of a receive end, comprising:
detecting an input current of a rectifier;
filtering the input current of the rectifier to obtain an input current fundamental component;
obtaining a phase difference between a phase of the input current and a phase of the input current fundamental component;
determining an actual phase shift angle by subtracting the phase difference from a preset phase shift angle;
controlling a phase of a bridge arm voltage of the rectifier to lag behind the phase of the input current fundamental component by the actual phase shift angle;
performing zero-crossing detection on the input current fundamental component to obtain a first square wave;
performing zero-crossing detection on the input current to obtain a second square wave; and
obtaining the phase difference between the phase of the input current and the phase of the input current fundamental component based on the first square wave and the second square wave.

8. The method according to claim 7, wherein the rectifier is a full-bridge rectifier comprising four controllable switching transistors, and wherein the bridge arm voltage is a voltage between a middle point of a leading bridge arm of the full-bridge rectifier and a middle point of a lagging bridge arm of the full-bridge rectifier.

9. The method according to claim 7, wherein the rectifier is a half-bridge rectifier comprising two controllable switching transistors, and wherein the bridge arm voltage is a voltage between a middle point of a bridge arm of the half-bridge rectifier and a ground.

10. The method according to claim 7, wherein the preset phase shift angle is 0, or the preset phase shift angle is a fixed preset value greater than 0.

* * * * *